United States Patent [19]
Ludowyk et al.

[11] Patent Number: 4,481,817
[45] Date of Patent: Nov. 13, 1984

[54] WORKPIECE LOADING APPARATUS

[75] Inventors: Christopher J. Ludowyk, South Brighton; Stewart G. W. Gee, Glen Huntly, both of Australia

[73] Assignee: Commonwealth of Australia, Australia

[21] Appl. No.: 382,674

[22] Filed: May 27, 1982

[30] Foreign Application Priority Data

Jun. 2, 1981 [AU] Australia .................. PE9164

[51] Int. Cl.³ .................. G01M 5/00; G01M 7/00
[52] U.S. Cl. .................. 73/583; 73/802
[58] Field of Search .................. 73/662, 802, 583, 849, 73/856, 860

[56] References Cited

U.S. PATENT DOCUMENTS 2,340,505 2/1944 Beed .................. 73/802
2,383,491 8/1945 Kemmer et al. .................. 73/802
2,425,273 8/1947 Watter .................. 73/802
2,505,887 5/1950 Edison .................. 73/802

FOREIGN PATENT DOCUMENTS 200845 10/1967 U.S.S.R. .................. 73/802
483598 12/1975 U.S.S.R. .................. 73/662

Primary Examiner—Gerald Goldberg
Assistant Examiner—John E. Chapman, Jr.
Attorney, Agent, or Firm—Stevens, Davis, Miller & Mosher

[57] ABSTRACT

Workpiece loading, particularly for dynamic testing of aircraft wings, is described. A double ended servo jack is drivably coupled to an upper drive lever which is pivotally mounted for movement relative to the workpiece. The follower end of the upper drive lever is coupled by a tension strap to a lower drive lever. The drive ends of the upper and lower levers are coupled to contour boards provided around the wing by means of whiffle trees so that the single jack applied both upwards and downwards forces to the wing.

2 Claims, 1 Drawing Figure

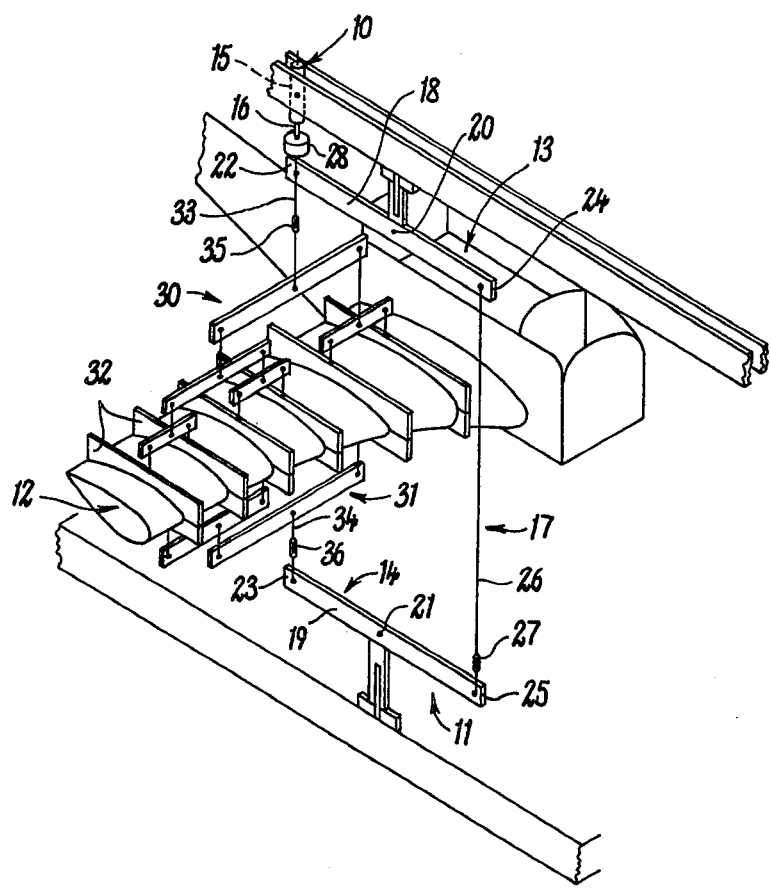

WORKPIECE LOADING APPARATUS

This invention relates to apparatus for alternately applying force to a workpiece from different directions. The invention has been particularly designed for use in dynamic testing such as the testing of aircraft wings, but may be used in other workpiece loading situations.

In known dynamic wing testing rigs a pair of hydraulic jacks is provided, one for applying a force from above the upper surface of the wing being tested and the other for applying force from below the lower surface of the wing. The forces have been applied to the wing through contour boards mounted to the wing at spaced locations. Each contour board comprises a pair of plates which are coupled together and define between them an aperture which is complementary to the wing surface shape. Each of the contour boards is generally parallel to the longitudinal direction of the airframe. The drive from the jacks is transmitted to the contour boards by means of upper and lower whiffle trees. A whiffle tree comprises a plurality of force distributing rods each of which extends generally transverse to the direction of the contour boards, i.e. in a lateral direction in which the wing extends. Each pair of adjacent contour boards is coupled to respective opposite ends of a primary force distributing rod which in turn is connected by its center point to one end of a secondary force distributing rod and so on, the final force distributing rod being connected by its center point to the hydraulic jack. Thus operation of the jack transmits a force through the cascade of force distributing rods to the contour boards and thus to the wing.

The difficulty with this prior art arrangement is that the upper and lower jacks must be operated in perfect synchronism to avoid undesired loads being applied to the wing or to the force transmission apparatus. Asynchronous operation of the two jacks may damage the test structure and/or the wing and may also render the results of the test unreliable.

It is an object of the present invention to provide a workpiece loading apparatus which can be used to ensure synchronous loading of a workpiece to which force is being applied from alternately different directions.

According to the present invention there is provided workpiece loading apparatus for alternately applying force to workpiece from different directions, the apparatus including a single drive means, a drive frame to which the drive means is coupled such that the drive means can apply a force in either of two directions to the drive frame, the drive frame having a first portion arranged to be operatively associated with the workpiece so as to apply a force to the workpiece from one direction when the drive means is operated in one of its two directions and a second portion arranged to be operatively associated with the workpiece so as to apply a force to the workpiece from the other direction when the drive means is operated in the other of its two directions.

The drive means may be a double ended servo jack having a jack cylinder in which a piston is movable, the piston being capable of being positively driven in either direction in the jack cylinder.

Preferably the two different directions for the force being applied to the workpiece are opposite directions. In this case the first portion of the drive frame would be arranged to be located at one side of the workpiece and the second portion of the workframe at the opposite side, the drive frame further including coupling means connecting the first and second portions so that the first and second portions move synchronously in the same direction.

The first and second portions of the drive frame each preferably include a drive lever which is pivotally mounted to a respective point fixed relative to the workpiece. Each drive lever preferably includes a drive end and an opposite follower end and is preferably pivotally mounted so as to be movable about a point located generally midway along the length of the lever between the drive and follower ends. The coupling means may comprise an elongated tension strap connected at its opposite ends to the respective follower ends of the two drive levers and operative to cause the levers to move synchronously.

The tension strap may be provided with a turnbuckle for enabling adjustment of the tension in the strap, the drive ends of the drive levers being arranged to be coupled to the workpiece through respective drive tension straps which are also provided with turnbuckles to enable adjustment of the tension in the drive straps, the tension maintained in the strap between the follower ends and in the drive strap ensuring that the strain applied to the workpiece varies continuously without any cross-over distortion as the force on the workpiece is changed from one direction to the other.

A preferred embodiment of a workpiece loading apparatus according to the present as applied to the dynamic testing of an aircraft wing is illustrated in the accompanying drawing which shows schematically a perspective view of the apparatus.

Referring now to the drawing the apparatus includes a single drive means 10 arranged to apply a force in either of two directions to a drive frame 11 which is operative to transmit the force to the wing 12 constituting the workpiece. A first or upper portion 13 of the drive frame 11 is arranged to be coupled to the wing 12 so as to apply a force to the wing 12 from one direction when the drive means 10 is operated in one of its two directions and a second or lower portion 14 of the drive frame is arranged to be coupled to the wing 12 so as to apply a force thereto from the other direction when the drive means 10 is operated in its other direction.

The drive means 10 may be any suitable drive means but is illustrated as a double ended servo jack 15 having a jack cylinder in which a piston 16 is movable, the piston 16 being capable of being positively driven in either direction in the jack cylinder.

In the illustrated arrangement the apparatus has been particularly designed for applying force to the wing from opposite directions, i.e. alternately from above and below the wing 12 undergoing dynamic testing. In this case the drive frame 11 to which the drive means 10 is coupled comprises a first or upper portion 13 above the wing and a second or lower portion 14 beneath the wing, the first and second portions 13, 14 being connected by coupling means 17 so that the portions 13,14 move synchronously in the same direction. The first and second portions 13,14 of the drive frame 11 each includes a drive lever 18, 19 which is pivotally mounted to a respective point 20,21 fixed relative to the wing 12. Each drive lever 18, 19 includes a drive end 22, 23 and an opposite follower end 24,25 and is pivotally mounted so as to be movable about points 20,21 which are located generally midway along the lengths of the levers 18,19 between the drive ends 22,23 and follower ends 24,25. The coupling means 17 comprises an elongated tension strap 26 connected at its opposite ends to the respective follower ends 24,25 of the drive levers 18,19 and the tension strap 26 is operative to cause the levers 18,19 to move synchronously. The tension strap 26 is provided with a turnbuckle 27 for enabling adjustment of the tension strap 26.

In the illustrated apparatus where the forces applied to the wing 12 are alternately upwardly and downwardly, the drive levers 18,19 are respectively above and below on opposite sides of the wing 12, and the respective drive ends 22,23 of the upper and lower drive levers 18,19 are connected to the wing 12 so as to transmit force to the wing 12. The drive means 10 comprising the hydraulic jack 15 is connected to the drive end 22 of the upper drive lever 18, although the jack may be connected to any convenient portion of the upper or lower drive lever 18,19. A load cell 28 is provided between the jack 15 and the drive end 22 of the upper drive lever 18 to enable monitoring of the force being applied to the wing 12. The respective follower ends 24,25 of the upper and lower drive levers 18,19 extend forwardly of the leading edge of the wing 12 and the tension strap 26 extends vertically from the upper drive lever 18 to the lower drive lever 19 in front of the leading edge of the wing 12.

The drive frame 11 may be coupled to the wing 12 by any convenient force transmitting means. However, in the illustrated example the drive frame 11 is coupled to the wing 12 by means of whiffle trees 30,31 located above and below the wing surfaces, the whiffle trees, 30,31 being connected to contour boards 32 mounted around the wing surfaces. In the illustrated embodiment each whiffle tree 30,31 is coupled to the respective drive end 22,23 of the upper and lower drive levers 18,19 by means of respective tension straps 33,34 which allow transmission of tensile force from the drive levers 18,19 to the respective whiffle trees 30,31 but which transmit negligible compressive force to the respective whiffle tree 30,31. The tension straps 33,34 between the drive ends 22,23 of the drive levers 18,19 and the respective whiffle trees 30,31 are provided with turnbuckles 35,36 to enable adjustment of the tension in the straps 33,34.

In use of the embodiments of the apparatus described above in relation to the accompanying drawing, upwardly and downwardly directed forces on the wing 12 may be applied alternately without danger of undesired loading being applied to the wing 12. For example, during downward movement of the jack piston 16 which causes a corresponding downward movement of the drive end 22 of the upper drive lever 18, the tension strap 26 between the follower ends 24,25 of the upper and lower drive levers 18,19 transmits the movement of the upper drive lever 18 to the lower drive lever 19 which, in turn, will produce a downwardly directed force on the wing 12 through the drive end 23 of the lower drive lever 19 and the lower whiffle tree 31. Negligible compressive force is applied by the upper whiffle tree 30 during this part of the operation of the apparatus since the strap 33 between the drive end 22 of the upper drive lever 18 and the upper whiffle tree 30 will not transmit such force. When the jack piston 16 is moved upwardly, the downwardly directed force previously applied by the lower whiffle tree 31 is relaxed and all force on the wing 12 is then applied through the drive end 22 of the upper drive lever 18 and the associated upper whiffle tree 30. The tension maintained in the straps 33, 34 between the drive ends 22,23 and the associated whiffle trees 30,31 by means of the turnbuckles 35,36, together with the tension in the strap 26, ensures that the strain applied to the wing 12 varies continuously without any cross-over distortion as the wing 12 passes through its unload or relaxed position.

Thus it will be seen that the apparatus of the present invention enables application of force of the aircraft wing 12 from above or below in perfect synchronism without undesired loads being applied. The provision of a single drive means 10 may also simplify the hydraulic circuitry associated with the testing apparatus and used for controlling and monitoring the testing operation.

Finally, it is to be understood that various alterations, modifications and/or additions may be made to the construction and arrangement of parts as herein described without departing from the scope of the present invention as defined in the appended claims.

I claim:

1. Workpiece loading apparatus for alternately applying force to workpiece from different directions, the apparatus including a single drive means, a drive frame to which the drive means is coupled such that the drive means can apply a force in either of two generally opposite directions to the drive frame, the drive frame having a first portion arranged to be located at one side of the workpiece and to be operatively associated with the workpiece so as to apply a force to the workpiece from one direction when the drive means is operated in one of its two directions and a second portion arranged to be located at the opposite side of the workpiece and to be operatively associated with the workpiece so as to apply a force to the workpiece from the opposite direction when the drive means is operated in the other of its two directions, the first and second portions of the drive frame each including a drive lever which is pivotally mounted to a respective fixed point in the vicinity of the workpiece, each drive lever including a drive end and an opposite follower end and being pivotally mounted so as to be movable about a point located between the drive and follower ends, the drive frame further including an elongated tension strap connected at its opposite ends to the respective follower ends of the two drive levers, the tension strap being operative to cause the drive levers to move synchronously.

2. Workpiece loading apparatus according to claim 1 wherein the tension strap is provided with a turnbuckle for enabling adjustment of the tension in the strap, the drive ends of the drive levers being arranged to be coupled to the workpiece through respective drive tension straps which are also provided with turnbuckles to enable adjustment of the tension in the drive straps, the tension maintained in the strap between the follower ends and in the drive strap ensuring that the strain applied to the workpiece varies continuously without any cross-over distortion as the force on the workpiece is changed from one direction to the other.

* * * * *